(12) United States Patent
Gasson

(10) Patent No.: US 10,946,388 B2
(45) Date of Patent: Mar. 16, 2021

(54) WEAR GAUGES AND METHODS TO ELECTRICALLY MONITOR THE WEAR EXTENT OF A WEAR SURFACE

(71) Applicant: SOUTHERN CROSS TRADING 5 (PTY) LTD, Gauteng (ZA)

(72) Inventor: Gary Coenrad Gasson, Gauteng (ZA)

(73) Assignee: SOUTHERN CROSS TRADING 5 (PTY) LTD, Gauteng (ZA)

( * ) Notice: Subject to any disclaimer, the term of this patent is extended or adjusted under 35 U.S.C. 154(b) by 365 days.

(21) Appl. No.: 15/910,059

(22) Filed: Mar. 2, 2018

(65) Prior Publication Data

US 2018/0333727 A1    Nov. 22, 2018

(30) Foreign Application Priority Data

May 17, 2017   (ZA) .................................. 2017/03419

(51) Int. Cl.
| | | |
|---|---|---|
| *B02C 17/18* | (2006.01) | |
| *B02C 17/22* | (2006.01) | |
| *G01N 27/04* | (2006.01) | |
| *G01B 7/06* | (2006.01) | |

(52) U.S. Cl.
CPC .......... *B02C 17/1805* (2013.01); *B02C 17/22* (2013.01); *G01B 7/06* (2013.01); *G01N 27/041* (2013.01); *B02C 2210/01* (2013.01)

(58) Field of Classification Search
CPC ..... B02C 17/18; B02C 17/1805; B02C 17/22; G01B 7/02; G01B 7/06; G01B 7/16; G01B 7/18; G01B 7/20; G01N 27/02; G01N 27/04; G01N 27/041; G01N 3/56
See application file for complete search history.

(56) References Cited

U.S. PATENT DOCUMENTS

| | | | | |
|---|---|---|---|---|
| 5,637,794 | A  * | 6/1997 | Hanisko | ................ F16D 66/026 340/453 |
| 6,208,128 | B1 * | 3/2001 | Braconnier | .............. G01B 7/06 324/700 |
| 6,366,201 | B1 * | 4/2002 | Hanisko | ................ F16D 66/026 188/1.11 E |
| 9,228,623 | B2 * | 1/2016 | Eichler | ................. F16D 66/021 |
| 2007/0163325 | A1 * | 7/2007 | Radzisewski | ............ G01N 3/56 73/7 |

(Continued)

*Primary Examiner* — Huy Q Phan
*Assistant Examiner* — David B Frederiksen
(74) *Attorney, Agent, or Firm* — Nixon & Vanderhye P.C

(57) ABSTRACT

A wear gauge 10 comprises an elongate substrate 12 having a proximal end 14 and a distal end 16. At least a first row 18 of spaced electronic components 22.1, 22.3 . . . 22.$n$ and a juxtaposed second row 20 of spaced electronic components 22.2, 22.4 . . . 22.$n-1$ are provided on the substrate. The first and second rows extend in a direction from the proximal end towards the distal end of the substrate. The electronic components 22.2 to 22.$n-1$ in the second row are spatially interposed between adjacent electronic components 22.1 to 22.$n$ in the first row. The electronic components of the first and second rows are electrically connected in parallel by conductive tracks 19. An electrical parameter relating to the parallel connection as measured at a port 24 of the parallel connection towards the proximal end, changes as electronic components are removed from the connection from the distal end, to provide an indication of the extent of wear, as indicated by the arrow A.

20 Claims, 7 Drawing Sheets

(56) References Cited

U.S. PATENT DOCUMENTS

| | | | |
|---|---|---|---|
| 2009/0219040 A1* | 9/2009 | Shinde | F01D 17/02 324/693 |
| 2012/0043980 A1* | 2/2012 | Davies | G01B 7/18 324/693 |
| 2016/0318356 A1* | 11/2016 | McMillen | B60C 11/243 |

* cited by examiner

Number of Gauge Resistors

Voltage Drop (V)

WEAR GAUGES AND METHODS TO ELECTRICALLY MONITOR THE WEAR EXTENT OF A WEAR SURFACE

A WEAR GAUGE

This application claims priority to ZA Patent Application No. 2017/03419 filed 17 May 2017, the entire contents of which is hereby incorporated by reference.

INTRODUCTION AND BACKGROUND

This invention relates to a wear gauge, a system for monitoring wear and a method of monitoring wear of a body.

Grinding of bulky raw material is typically performed by utilizing a mill, such as a ball, Semi-Autogenous Grinding (SAG) or autogenous mill comprising a drum comprising a shell having a feed end and a discharge end. The shell is internally lined with a liner. The liner resists abrasion and protects the shell against wear.

In order to prevent damage to the shell, the liner needs to be replaced when the liner has worn down to a predetermined remaining thickness. Devices for providing early warning that the liner thickness is approaching the predetermined thickness are known in the art. However, the wear measurement resolution of the known devices may not be suitable for at least some applications.

OBJECT OF THE INVENTION

Accordingly, it is an object of the present invention to provide a wear gauge, a system for monitoring wear and a method of monitoring wear of a body with which the applicant believes the aforementioned problems may at least be alleviated or which may provide a useful alternative for the known devices, systems and methods.

SUMMARY OF THE INVENTION

According to the invention there is provided a wear gauge comprising:
  an elongate substrate having a proximal end and a distal end;
  at least a first row of spaced electronic components and a juxtaposed second row of spaced electronic components provided on the substrate, the first and second rows extending in a direction from the proximal end towards the distal end of the substrate; and
  the electronic components in the second row being at least partially interposed between the electronic components in the first row and the electronic components of the first and second rows being electrically connected to one another in an electrical connection having a port,
the arrangement being such that an electrical parameter relating to the connection as measured at the port changes as electronic components are removed from the connection from the distal end of the substrate.

The connection may be a parallel connection, the port may be located towards the proximal end and the arrangement may be such that an electrical parameter relating to the parallel connection as measured at the port of the parallel connection changes as electronic components are removed from the parallel connection from the distal end of the substrate.

The electronic components may comprise resistors.

The electrical parameter relating to the parallel connection may be the parallel resistance of the resistors as measured at the port.

The resistors may all have the same resistance value. Any suitable value may be used, for example about 100 kΩ.

The wear gauge may be provided in an elongate housing comprising a head and a shank extending from the head.

The shank may comprise an external thread towards an end thereof remote from the head.

According to a second aspect of the invention there is provided a system for monitoring wear, the system comprising:
  a wear gauge comprising:
    an elongate substrate having a proximal end and a distal end;
    at least a first row and a juxtaposed second row of spaced electronic components provided on the substrate, the first and second rows extending in a direction from the proximal end towards the distal end of the substrate; and
    the electronic components in the second row being at least partially interposed between the electronic components in the first row and the electronic components of the first and second rows being electrically connected in parallel,
  the arrangement being such that an electrical parameter relating to the parallel connection as measured at a port of the parallel connection towards the proximal end of the substrate changes as electronic components of the connection are removed from the connection from the distal end of the substrate; and
  electronic circuitry which is connected to the port for repetitively measuring the parameter.

The system may comprise a wireless transmitter, such as an RF transmitter, connected to the circuitry to transmit data relating to the measured parameter to a remote location for further processing.

The wear gauge may be provided in an elongate housing comprising a head and a shank extending from the head.

The shank may comprise an external thread at an end thereof remote from the head.

The wear gauge may be utilized to measure the extent of wear in a mill such as a grinding mill. The mill may comprise a cylindrical drum having a central axis. The drum may comprise a shell and an internal liner for the shell and the wear gauge may be used to measure the extent of wear of the liner.

In use, the housing with internal gauge may extend radially into the liner with the head retained in the liner preferably by one of counter-sinking and a counter-bore in the liner.

The housing may be fastened to the shell of the drum. The head of the housing may terminate flush with a wear surface of the liner.

The wear surface of the liner may be exposed to abrasion and may wear in a radial direction relative to the central axis of the drum. The housing and electronic components may wear away sequentially with the liner, thereby changing the measured parameter for indicating the extent of wear of the liner.

The port may comprise first and second terminals.

The electronic circuitry may comprise a voltage divider network between first and second poles of a voltage source, the voltage divider network comprising a serial connection of a measurement resistor and said parallel connection of electronic components.

The electronic circuitry may further comprise an amplifier, an analog to digital converter and a processor.

The first terminal of the port may be connected to the first pole of the voltage source and the second terminal of the port may be connected via the measurement resistor to the second pole of the voltage source.

An input of the amplifier may be connected over the measurement resistor and an output of the amplifier may be connected to an input of the analog to digital converter.

An output of the analog to digital converter may be connected to the processor.

Also included within the scope of the invention there is provided a method of monitoring wear of a body having a wear surface, the method comprising the steps of:

utilizing an elongate substrate having a proximal end and a distal end; at least a first row of spaced electronic components and a juxtaposed second row of spaced electronic components provided on the substrate, the first and second rows extending in a direction from the proximal end towards the distal end of the substrate; the electronic components in the second row being at least partially interposed between the electronic components in the first row and the electronic components of the first and second rows being electrically connected to one another in an electrical connection having a port, the arrangement being such that an electrical parameter relating to the connection as measured at the port changes as electronic components are removed from the connection in a direction from the distal end of the substrate;

embedding the substrate in the body with the distal end adjacent the wear surface of the body and allowing electronic components to be removed from the connection as the body wears; and repeatedly measuring the parameter, thereby to determine the extent of the wear of the body.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
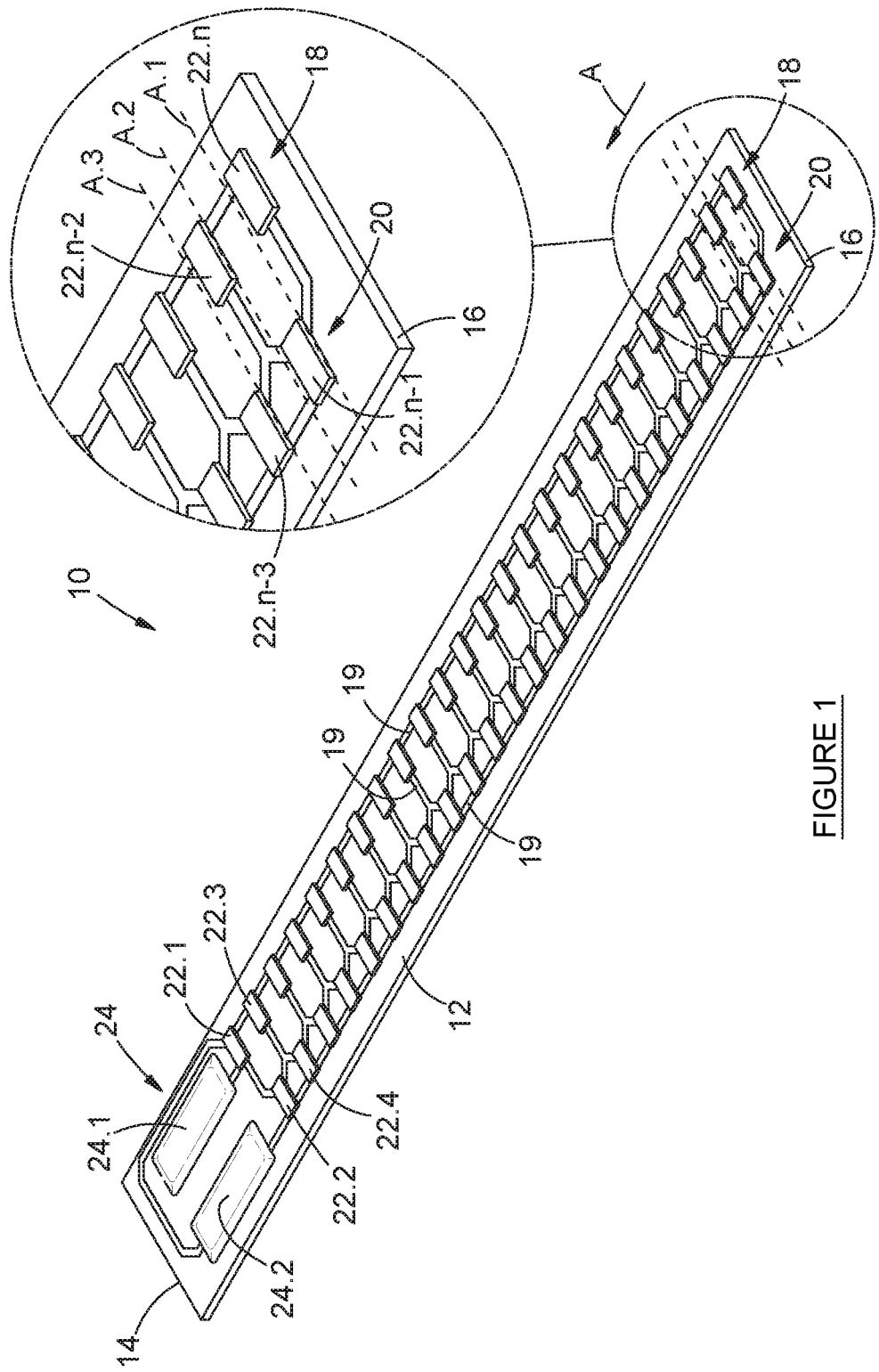
FIG. 1 is a perspective view of a wear gauge.

An example embodiment of a wear gauge is generally designated by the reference numeral 10 in FIG. 1.

The wear gauge 10 comprises an elongate substrate 12 having a proximal end 14 and a distal end 16. At least a first row 18 of spaced electronic components 22.1, 22.3 . . . 22.$n$ and a juxtaposed second row 20 of spaced electronic components 22.2, 22.4 . . . 22.$n$−1 are provided on the substrate 12. The first and second rows 18, 20 extend in a direction from the proximal end 14 towards the distal end 16 of the substrate 12. The electronic components 22.2 to 22.$n$−1 in the second row 20 are spatially interposed between adjacent electronic components 22.1 to 22.$n$ in the first row 18. The electronic components of the first and second rows 18, 20 are electrically connected in parallel by conductive tracks 19. An electrical parameter relating to the parallel connection as measured at a port 24 of the parallel connection towards the proximal end 14, changes as electronic components of the connection are removed from the connection from the distal end and is therefore indicative of the extent of wear from the distal end 16, as indicated by the arrow A.

The electronic components 22.1 to 22.$n$ preferably comprise resistors. The electrical parameter measured at the port 24 is the parallel resistance of the parallel connection. The port 24 comprises a first terminal 24.1 and a second terminal 24.2. The resistors 24.1 to 24.$n$ preferably all have the same resistance value. A suitable value, for example about 100 kΩ is utilized. The resistors are provided at respective preselected distances from the distal end 16.

Figure 2:
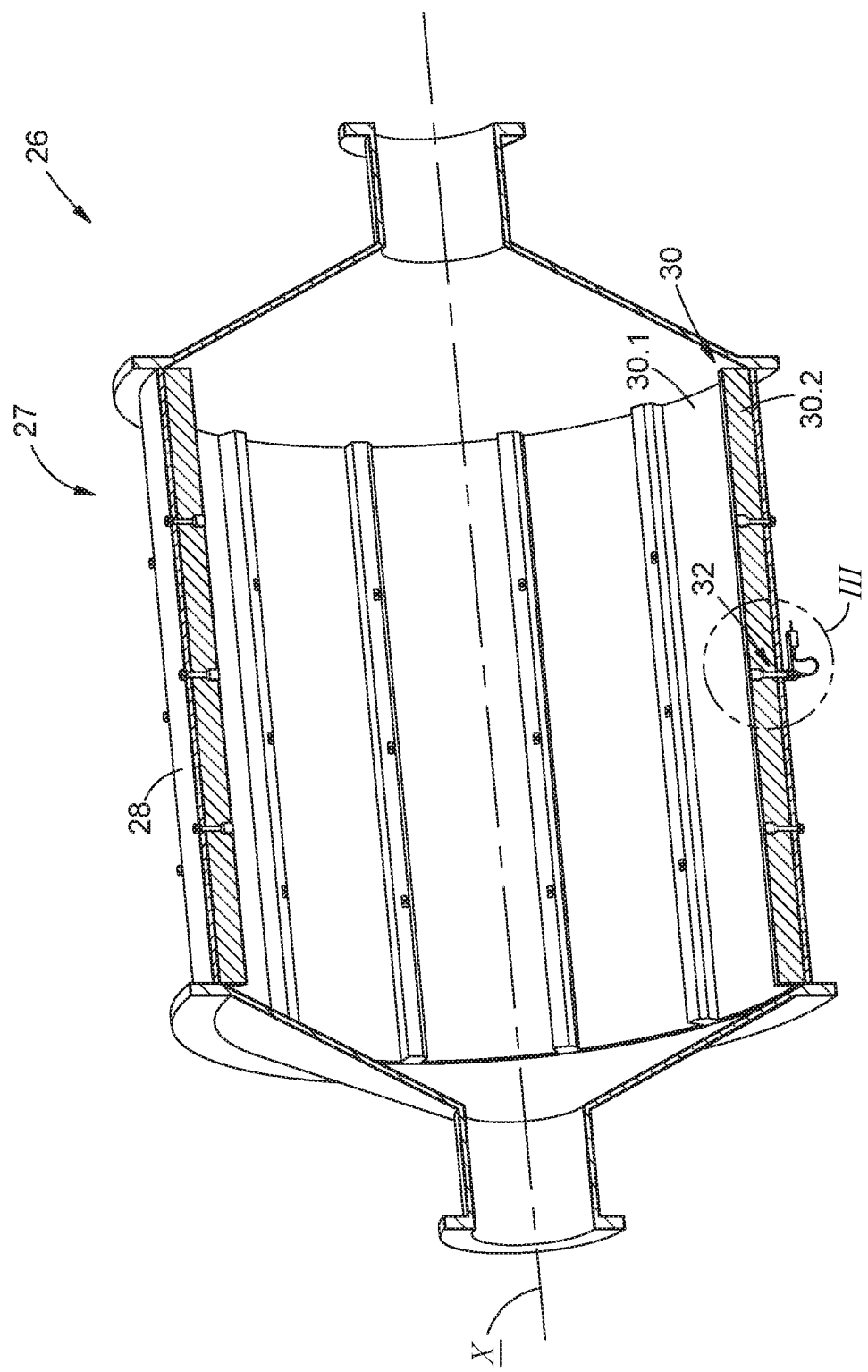
FIG. 2 is a sectional view of a mill comprising a drum comprising a shell and an internal liner.

In FIG. 2 is shown a sectional view of a mill 26 comprising a cylindrical drum 27 having a central axis X. The mill 26 may be grinding mill such as a ball mill. The drum 27 comprises a cylindrical shell 28 and an internal liner 30. The liner 30 comprises a first part 30.1 (shown in FIGS. 2 and 4) abutting the shell and a second part 30.2 (shown in FIGS. 2 to 4) also abutting the shell, but protruding beyond the first part. The protruding part 30.2 is commonly referred to as a lifting bar. In use, the wear gauge 10 is housed in an elongate housing 32 which is shown in more detail in FIG. 3.

Figure 3:
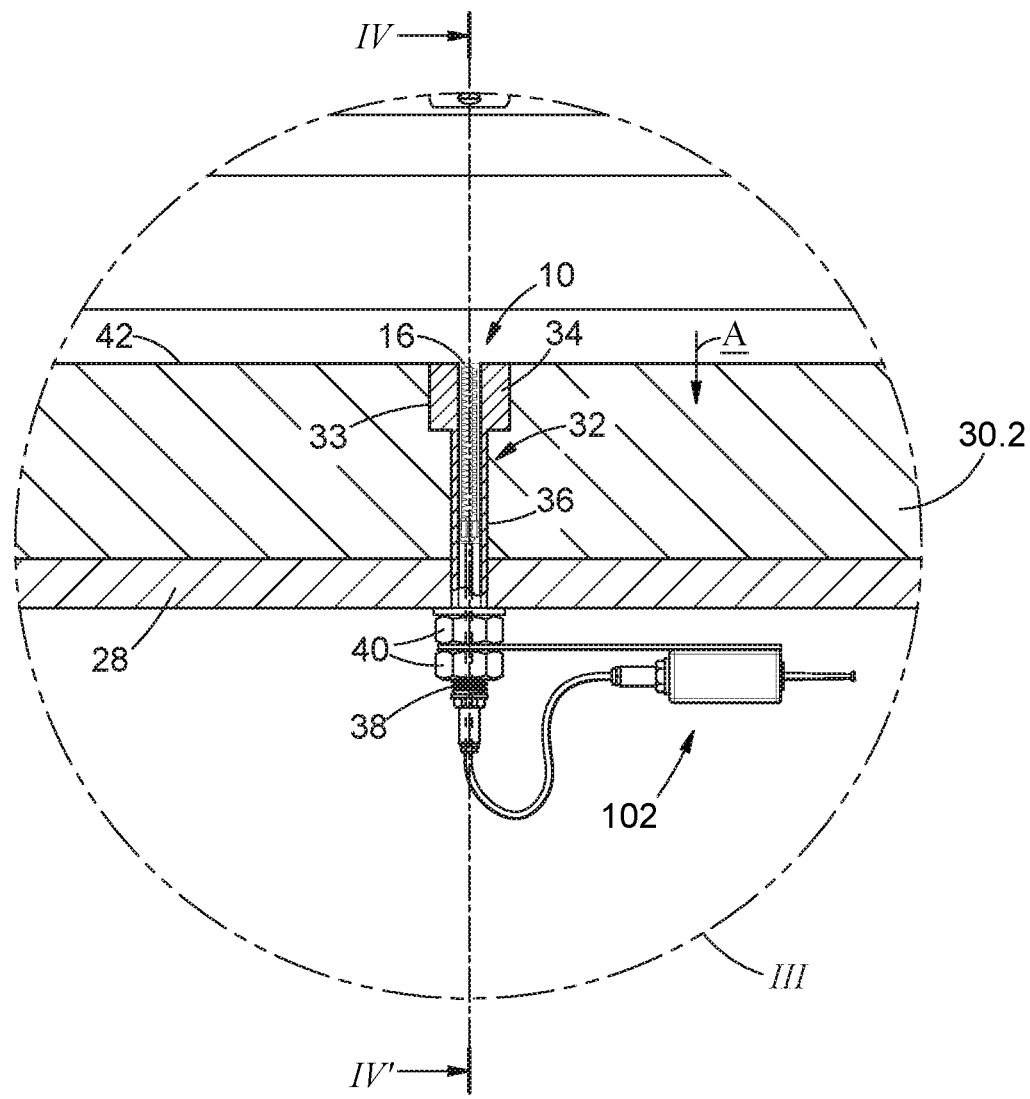
FIG. 3 is an enlarged view of a portion designated /// in FIG. 2, illustrating a housing and the gauge provided in the housing and a measuring unit connected to the gauge.

In FIG. 3 is shown an enlarged view of a portion designated /// in FIG. 2, illustrating the housing 32 and the gauge 10 located in the housing. The housing 32 is preferably made of steel and comprises a head 34 and a tubular shank 36 extending from the head. Hence, the housing 32 preferably has a hammer-head shape. The shank 36 comprises an external thread 38 at an end remote from the head 34. The external thread cooperates with an internal thread of a nut 40, to fasten the housing 32 to the shell 28. In use, the housing 32 extends radially into the liner 30 with the head 34 retained in the liner 30 preferably via counter-sinking or by a counter-bore 33 in the liner. The housing 32 and the distal end 16 of the wear gauge 10 preferably terminate flush with a wear surface 42 of the liner 30. The gauge 10 may be embedded in a filler 35 (shown in FIG. 4) such as an adhesive, epoxy resin or the like in the housing.

Figure 4:
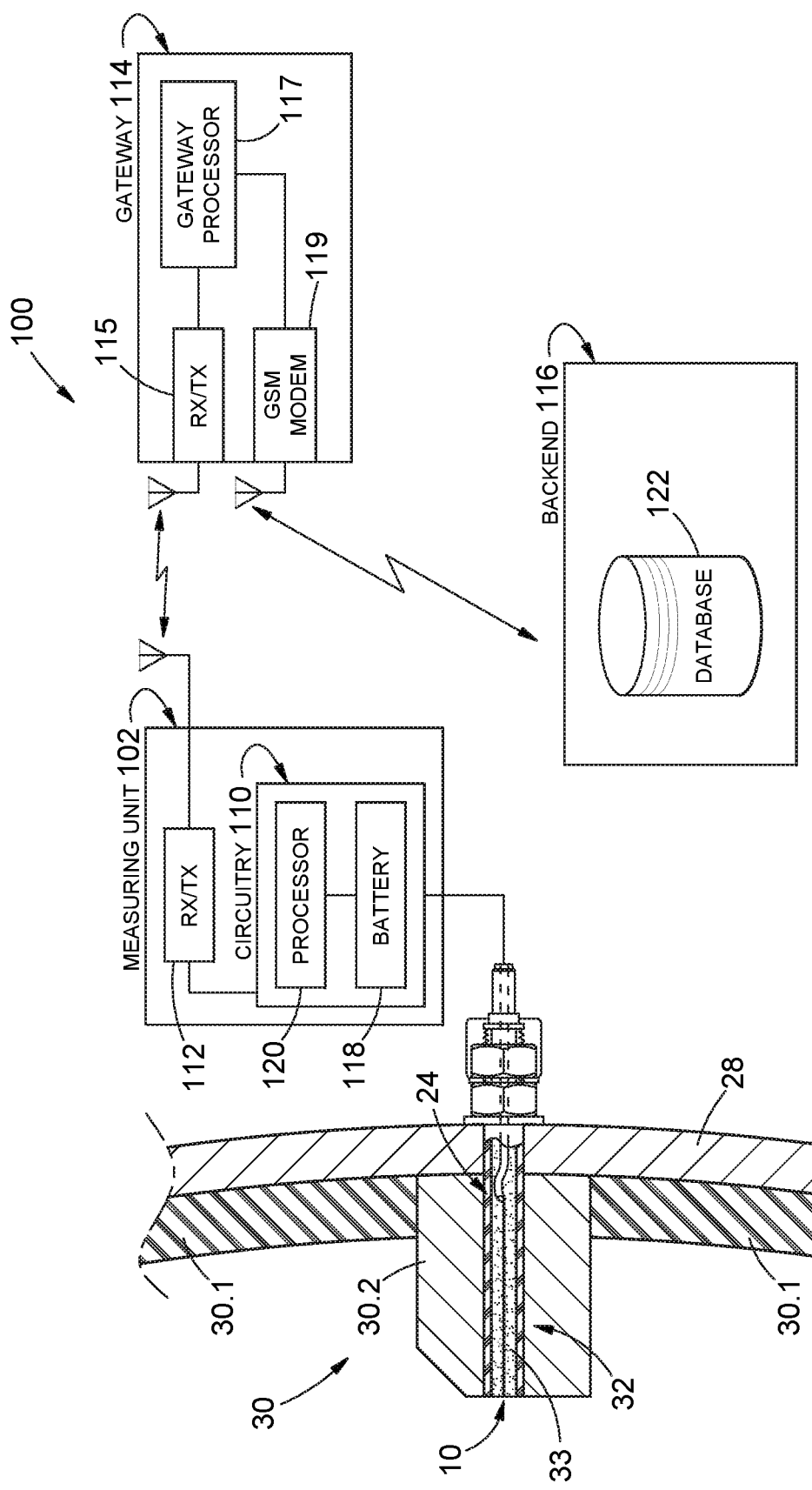
FIG. 4 is a diagrammatic sectional view on line IV-IV' in FIG. 3 and a high-level block diagram of a system for monitoring wear.

In FIG. 4 is shown a diagrammatic representation illustrating a sectional view on line IV-IV' in FIG. 3 and a high-level block diagram illustrating a system 100 for monitoring wear. The system 100 comprises the wear gauge 10 and a measuring unit 102 comprising electronic circuitry 110 which is connected to the port 24 for repetitively measuring the parameter. A transmitter 112 is connected to the circuitry 110 to transmit data relating to the measured parameter to remote locations 114, 116 for further processing. The circuitry 110 comprises a battery 118 which is provided as voltage source for the remainder of the circuitry, which includes a processor 120. At the remote locations, there may be provided at least one of a gateway 114 and a backend 116. The gateway 114 comprises a receiver 115 connected to a gateway processor 117 which is connected to a transmitter, preferably in the form of a Global System for Mobile Communications (GSM) modem 119. The backend 116 comprises at least a server and a database 122, which are in data communication with the gateway in known manner.

Figure 5:
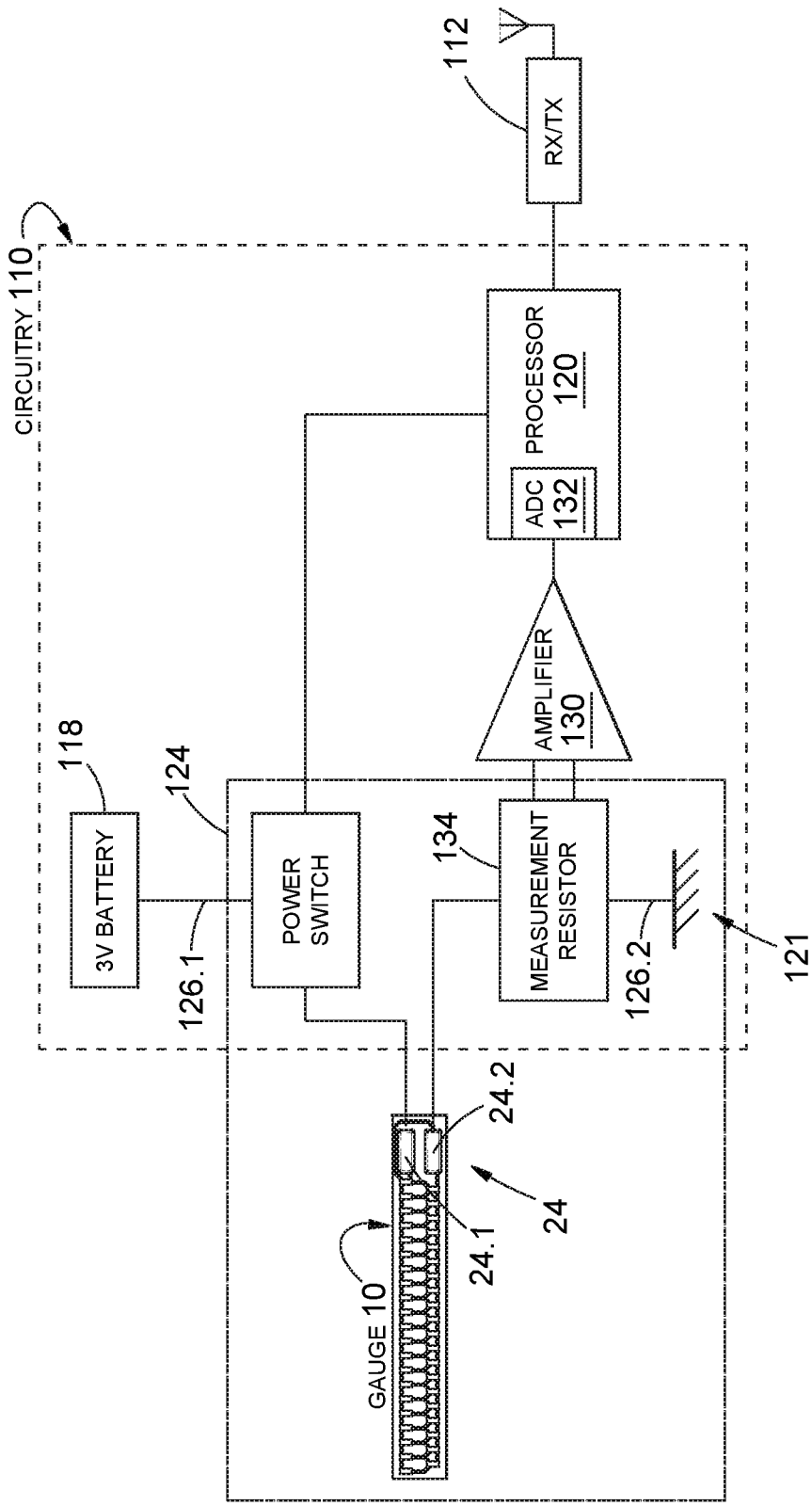
FIG. 5 is a block diagram illustrating the gauge and electronic circuitry of a monitoring unit connected to the gauge.

In FIG. 5 is shown a block diagram illustrating the gauge 10 connected to the electronic circuitry 110. The circuitry 110 comprises a voltage divider network 124 connected between first and second poles 126.1, 126.2 of the voltage source. The voltage divider network 124 comprises a serial connection of a measurement resistor 134 and the parallel connection 22.1 to 22.$n$. The electronic circuitry 110 further comprises an amplifier 130, an analog to digital converter 132 and the processor 120. The first terminal 24.1 of the port 24 is connected to the first pole 126.1 of the voltage source, whereas the second terminal 24.2 of the port 24 is connected via the measurement resistor 134 to the second pole 126.2 of the voltage source. An input of the amplifier 130 is connected over the measurement resistor 134 and an output of the amplifier 130 is connected to an input of the analog to digital converter (ADC) 132. An output of the ADC 132 is connected to the processor 120 in known manner.

Referring to FIGS. 1 to 5, in use, the housing 32 (with the gauge 10 located in the housing) is secured to the drum 27 of the mill 26 as described above. The wear surface 42 of the liner 30 is in use exposed to abrasion and wears in a generally radial direction (as indicated by the arrow A in FIGS. 1 and 3) relative to the central axis X of the drum 27, as material is ground by the mill. Hence, the resistors 22.$n$ to 22.1 are sequentially worn away in a direction from the distal end 16 towards the proximal end 14, which causes the parallel resistance to change, indicating the extent of wear of the liner 30.

Referring to FIGS. 4 and 5, a signal at the output of the amplifier 130 is indicative of a voltage drop over the measurement resistor 134. From the ADC 132, the processor 120 receives data relating to the voltage drop. The output voltage of the battery 118 is measured in real time at the measuring unit 102. The data relating to the voltage drop and other data such as the data relating to the output voltage of battery 118 are transmitted by transmitter 112 to local gateway 114 and via GSM modem 119 to backend 116 for further processing.

Figures 6, 7:
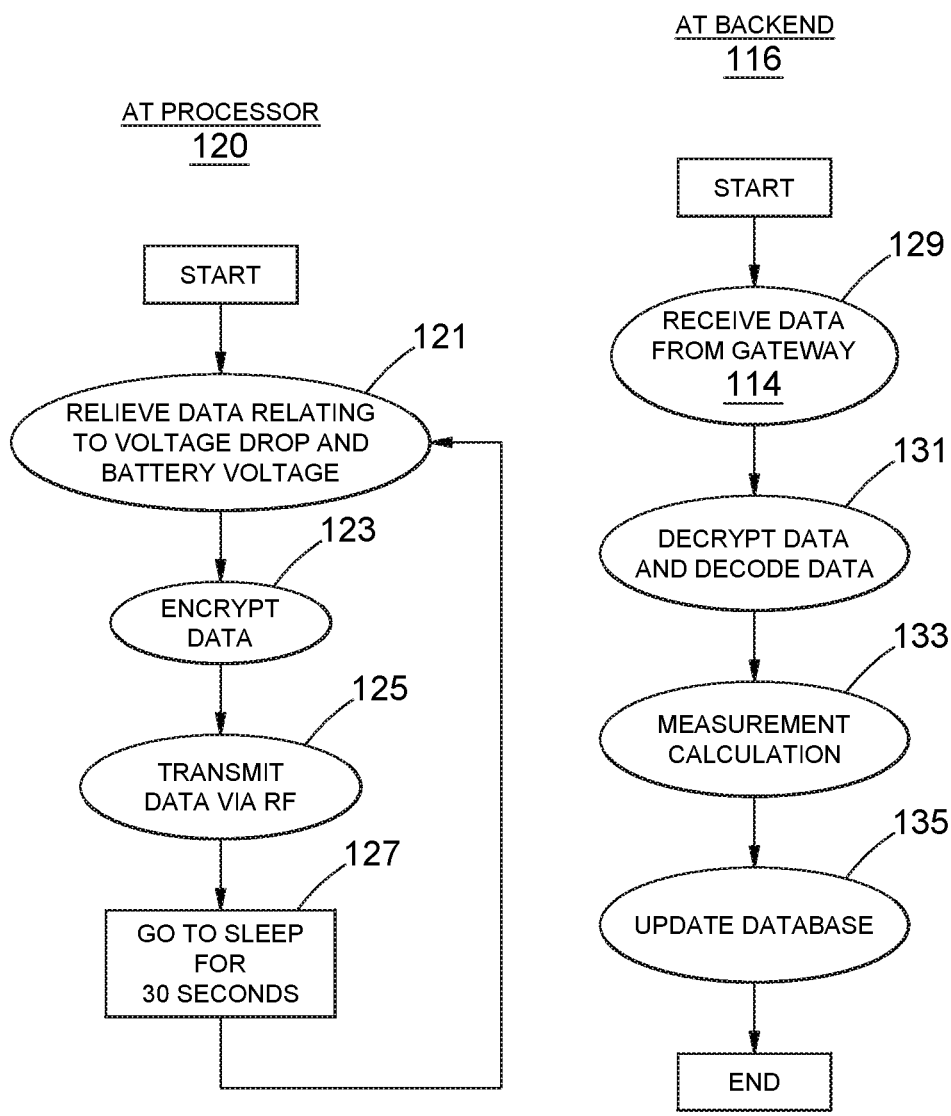
FIG. 6 is a flow diagram illustrating steps of a method of monitoring wear as performed on a processor forming part of the measuring unit.
FIG. 7 is a flow diagram illustrating the steps of the method of monitoring wear as performed at a backend.

In FIG. 6 is shown a flow diagram illustrating steps of a method for monitoring wear as performed at processor 120 on board measuring unit 102. At 121, data relating to the voltage drop and data relating to the battery voltage are received. At 123, the data may be encrypted. At 125, the data is transmitted to the gateway 114. At 127, the measuring unit 102 is put to sleep for example for a period of 30 seconds, before returning to step 121. The data may be encoded by the gateway 114 before being transmitted via GSM to backend 116.

In FIG. 7 is shown a flow diagram illustrating steps of the method for monitoring wear as performed at the backend 116. At 129, the encoded and encrypted data is received. At 131, the data is decrypted and decoded. At 133, a calculation is performed to calculate the parallel resistance of the gauge 10. The calculation further comprises determining a current length of the gauge 10. The calculated parallel resistance and the pre-selected distances of the resistors 22.1 to 22.$n$ are utilized in the calculation to indicate the extent of wear of the liner 30. At 135, the database is updated with data relating to the calculation.

Figure 8:
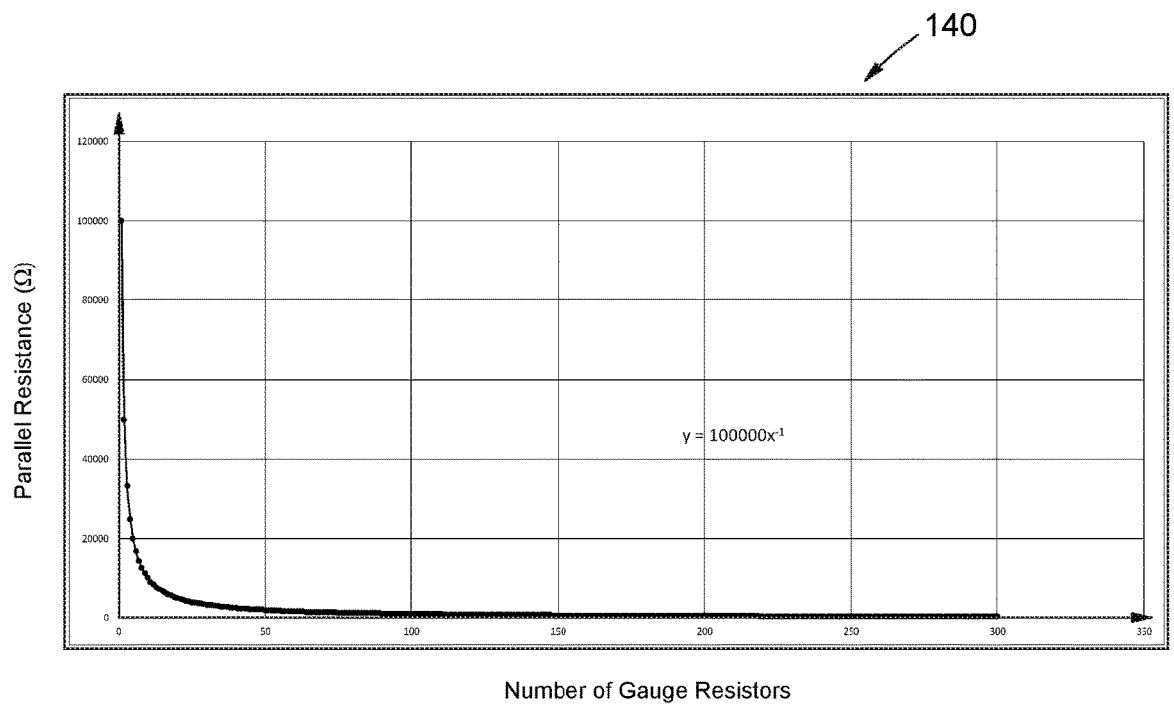
FIG. 8 is a graph of parallel resistance value against number of gauge resistors.
Figure 9:
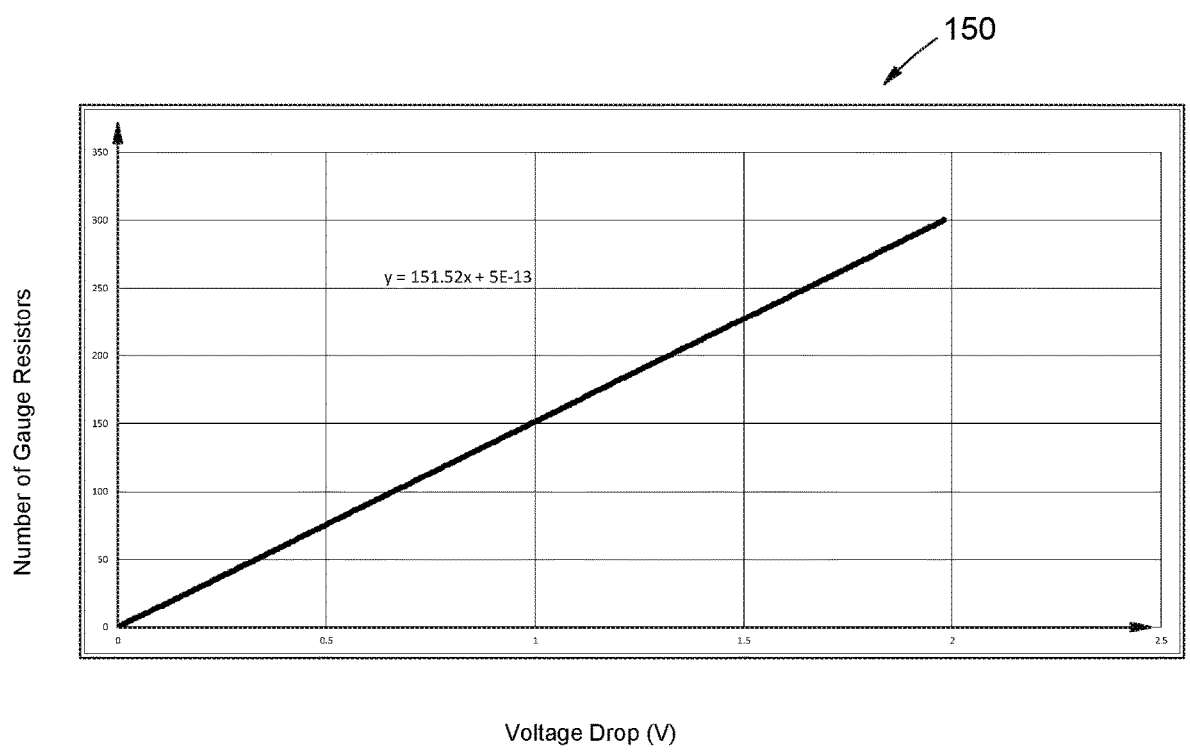
FIG. 9 is a graph of number of gauge resistors against voltage measured.

In FIG. 8 is shown an example graph 140 of parallel resistance value (0) against number of gauge resistors 22.1 to 22.$n$, for the case of n=300. In FIG. 9 is shown an example graph 150 of number of gauge resistors against voltage measured (V) over the measurement resistor 134 and at the output of the amplifier 130. The data relating to the measured battery voltage is utilized to derive an equation of number of parallel gauge resistors 22.1 to 22.$n$ against the voltage over the measurement resistor 134. One example of such an equation is represented by the graph 150 in FIG. 9. The measured voltage over the measurement resistor 134 is then used in the equation to yield a number of remaining gauge resistors 22.1 to 22.$n$. Utilizing the known pre-selected distances of the resistors 22.1 to 22.$n$ from the distal end 16 of the substrate 12, backend 116 is enabled to calculate the extent of wear in the liner 30, in real time while the mill is running.

Referring to FIG. 1, when the wear surface 42 has reached a first level A.1 (shown in the enlarged part of FIG. 1) on the gauge, resistor 22.$n$ is removed from and no longer forms part of the parallel connection. The voltage drop over the measurement resistor 134 changes accordingly. The axially spaced center lines (not shown) of resistors 22.1 to 22.$n$ are spaced at about 0.5 mm from one another. Resistor 22.$n$ is also spaced 0.5 mm from the distal end 16. Hence, the first level A.1 is between 0.5 mm and 1 mm from the distal end 16, whereas a second level A.2 is between 1 mm and 1.5 mm from the distal end. Hence, when only resistor 22.$n$ is worn away, an amount of wear of more than 0.5 mm, but less than 1 mm can be inferred when backend 116 determines that the change in the voltage drop corresponds to resistors 22.1 to 22.$n$−1 only being left on the substrate 12. Similar inferences are drawn for further wear levels A.2, A.3 etc Referring to FIG. 9, in an example case of a measured voltage drop of 1 V on graph 150, approximately 150 gauge resistors would be left on the gauge, which corresponds to 150×0.5=approximately 75 mm of wear of the liner in direction of the arrow A in FIGS. 1 and 3. As described above, the resistors 22.2 to 22.$n$−1 in the second row 20 are spatially interposed between the resistors 22.1 to 22.$n$ in the first row 18. Hence, the resolution of the measured data is better than in the case of only one row of resistors being utilized.

It will be appreciated that by utilizing the gauge 10, the system 100 is enabled to provide continuous wear readings during operation of the mill 26.

It will further be appreciated that there are many variations in detail on the invention as herein defined and/or described without departing from the scope and spirit of the appended claims.

For example, data relating to a unique identifier of the monitoring unit 102 and/or the gauge 10 may be included with the data transmitted by the monitoring unit 102. This data relating to the unique identifier may also be stored in the database 122 at the backend 116.

Referring to FIG. 4, it will be appreciated that the gauge is provided to measure the wear level in the second protruding part 30.2 or lifting bar of the liner 30. However, other parts, such as the first part 30.1 of the liner 30 may also be monitored, by providing the housing 32 in the first part 30.1. Liners provided in other regions of the mill 26 for example at the outlet, may also be measured with the gauge 10. For example, the gauge may be utilized to measure wear in liners which extend axially into the mill at the outlet, or to measure wear in liners which extend at an acute angle relative to the central axis X. Other liners such as substantially flat liners may also be monitored utilizing the gauge 10. The housing 32 may even be omitted by providing or embedding the substrate 12 with components 22.1 to 22.$n$ in the liner.

The gauge 10 may furthermore be utilized to measure wear of any surface and this specification is not limited in scope to measuring wear of internal liners of mills.

The invention claimed is:

1. A wear gauge comprising:
   an elongate substrate having a proximal end and a distal end;
   at least a first row of spaced electronic components and a juxtaposed second row of spaced electronic components provided on the substrate, the first and second rows extending in a direction from the proximal end towards the distal end of the substrate; and
   the electronic components in the second row being at least partially interposed between the electronic components in the first row and the electronic components of the first and second rows being electrically connected to one another in an electrical connection having a port, wherein
   the first and second rows of spaced electronic components are arranged such that an electrical parameter relating to the electrical connection as measured at the port changes as electronic components are removed from the electrical connection from the distal end of the substrate.

2. The wear gauge as claimed in claim 1, wherein the electrical connection is a parallel electrical connection and wherein the port is located towards the proximal end of the substrate.

3. The wear gauge as claimed in claim 2, wherein the electronic components comprise resistors.

4. The wear gauge as claimed in claim 3, wherein the electrical parameter relating to the parallel electrical connection is a parallel resistance of the resistors as measured at the port.

5. The wear gauge as claimed in claim 3, wherein the resistors all have a resistance value which is the same.

6. The wear gauge as claimed in claim 5, wherein the resistance value of each of the resistors is about 100 k$\Omega$.

7. The wear gauge as claimed in claim 1, wherein the wear gauge is provided in an elongate housing comprising a head and a shank extending from the head; and wherein the distal end of the substrate is located in the head.

8. A system for monitoring wear of a liner, the system comprising:
   a wear gauge comprising:
      an elongate substrate having a proximal end and a distal end;
      at least a first row of spaced electronic components and a juxtaposed second row of spaced electronic components provided on the substrate, the first and second rows extending in a direction from the proximal end towards the distal end of the substrate; and
      the electronic components in the second row being at least partially interposed between the electronic components in the first row and the electronic components of the first and second rows being electrically connected in parallel, wherein
      the first and second rows of spaced electronic components are arranged such that an electrical parameter relating to the parallel electrical connection as measured at a port of the parallel electrical connection towards the proximal end of the substrate changes as electronic components are removed from the electrical connection from the distal end of the substrate; and
   electronic circuitry which is connected to the port for repetitively measuring the parameter.

9. The system as claimed in claim 8, further comprising a wireless transmitter connected to the circuitry to transmit data relating to the measured parameter to a remote location for further processing.

10. The system as claimed in claim 8, wherein the wear gauge is utilized to measure an extent of wear of the liner, and wherein the wear gage is embedded in the liner.

11. The system as claimed in claim 10, wherein the liner lines a shell of a cylindrical drum of a mill.

12. The system as claimed in claim 10, wherein the wear gauge is provided in an elongate housing comprising a head and a shank extending from the head, and wherein the distal end of the substrate is located in the head.

13. The system as claimed in claim 12, wherein the head of the housing terminates flush with a wear surface of the liner.

14. The system as claimed in claim 10, wherein, in use, the electronic components wear away sequentially with the liner, thereby changing the measured parameter for indicating the extent of wear of the liner.

15. The system as claimed in claim 8, wherein the electronic circuitry comprises a voltage divider network between first and second poles of a voltage source, the voltage divider network comprising a serial connection of a measurement resistor and said parallel connection of electronic components.

16. The system as claimed in claim 15, wherein the port comprises first and second terminals.

17. The system as claimed in claim 16, wherein the first terminal of the port is connected to the first pole of the voltage source and the second terminal of the port is connected via the measurement resistor to the second pole of the voltage source.

18. The system as claimed in claim 15, wherein an input of an amplifier is connected over the measurement resistor and an output of the amplifier is connected to an input of an analog to digital converter.

19. The system as claimed in claim 18, wherein an output of the analog to digital converter is connected to a processor.

20. A method of monitoring wear of a body having a wear surface, the method comprising the steps of:
   (a) utilizing an elongate substrate having a proximal end and a distal end; at least a first row of spaced electronic components and a juxtaposed second row of spaced electronic components provided on the substrate, the first and second rows extending in a direction from the proximal end towards the distal end of the substrate; the electronic components in the second row being at least partially interposed between the electronic components in the first row and the electronic components of the first and second rows being electrically connected to one another in an electrical connection having a port, wherein the first and second rows of spaced electronic components are arranged such that an electrical parameter relating to the electrical connection as measured at the port changes as electronic components are removed from the electrical connection in a direction from the distal end of the substrate;
   (b) embedding the substrate in the body with the distal end adjacent the wear surface of the body and allowing electronic components to be removed from the connection as the body wears; and
   (c) repeatedly measuring the electrical parameter thereby to determine an extent of the wear of the body.

* * * * *